(No Model.) 2 Sheets—Sheet 2.
D. WILDE.
FRICTIONAL GEARING.
No. 369,760. Patented Sept. 13, 1887.
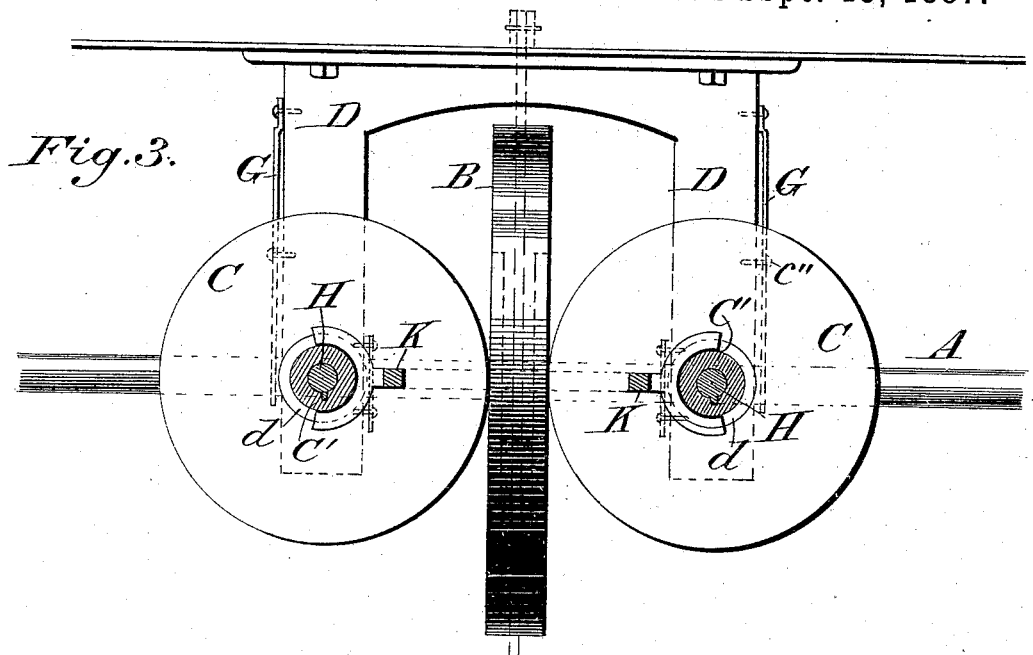
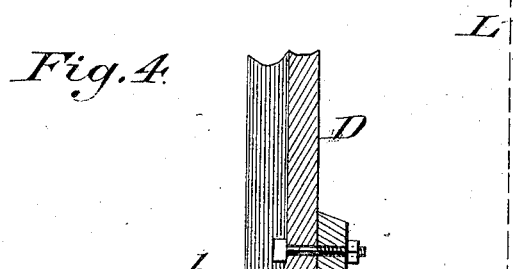
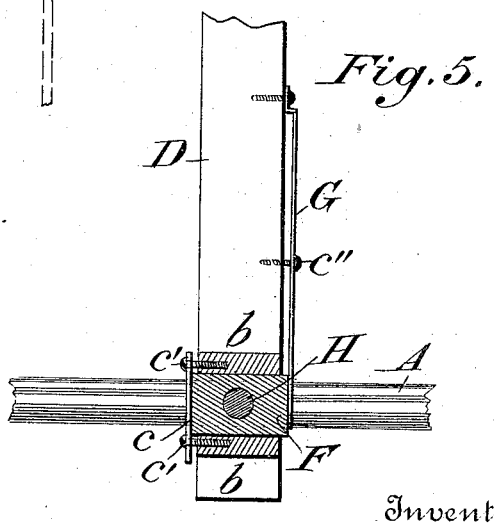
Witnesses
F. H. Schott
Geo. Frere Hurt
Inventor
Daniel Wilde
By his Attorney John C. Tasker

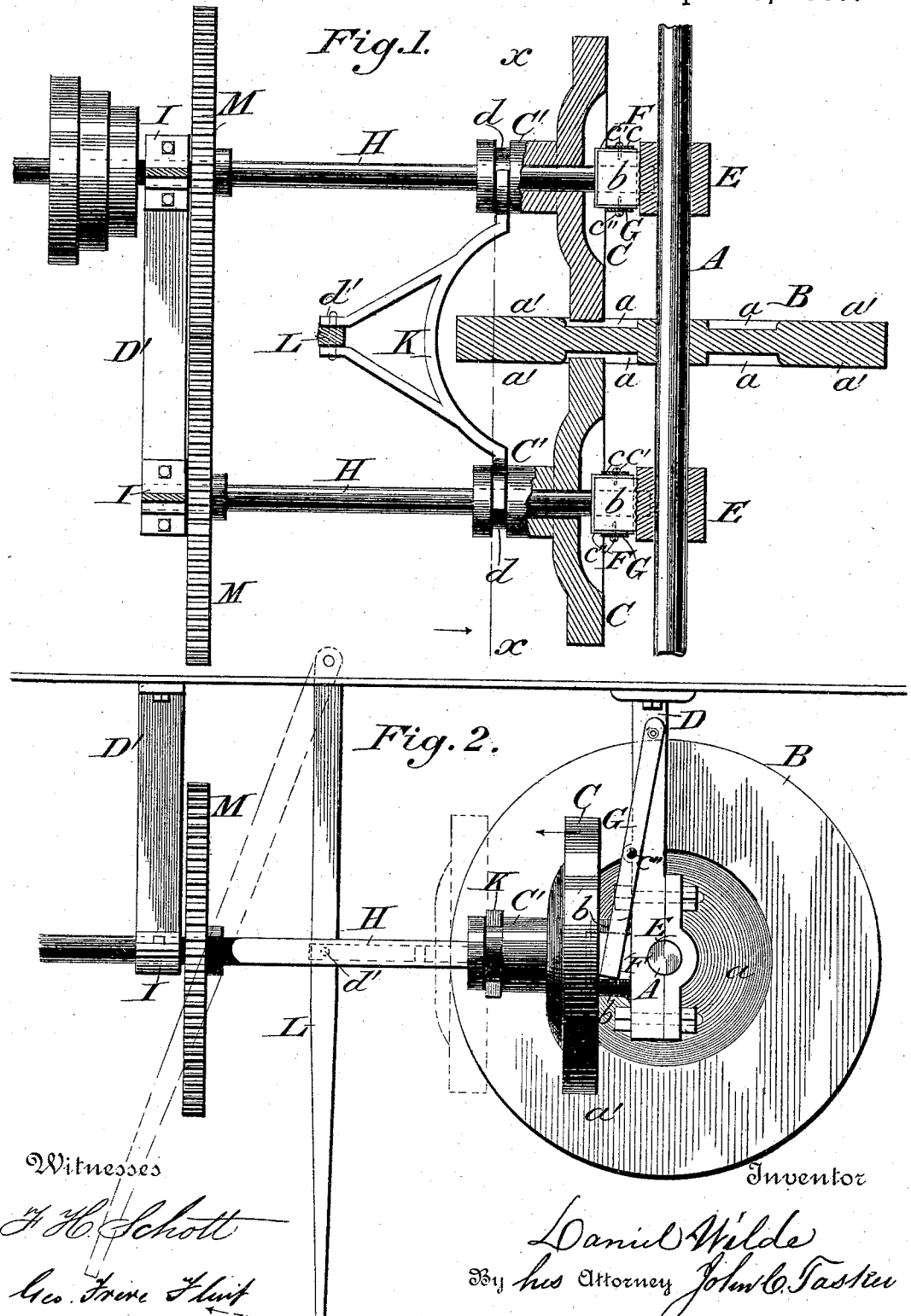

UNITED STATES PATENT OFFICE.

DANIEL WILDE, OF WASHINGTON, IOWA.

FRICTIONAL GEARING.

SPECIFICATION forming part of Letters Patent No. 369,760, dated September 13, 1887.

Application filed June 27, 1887. Serial No. 242,608. (No model.)

*To all whom it may concern:*

Be it known that I, DANIEL WILDE, a citizen of the United States, residing at Washington, in the county of Washington and State of Iowa, have invented certain new and useful Improvements in Frictional Gearing; and I do hereby declare the following to be a full, clear, and exact description of the invention, such as will enable others skilled in the art to which it appertains to make and use the same.

This invention relates to an improvement in frictional gearing, the object being to provide a mode of transferring power and motion from a prime mover to the different machines to which it may be applied, and also to provide a way by which said motion may be stopped entirely or increased or decreased, as the work performed by the machine may demand.

It consists of a main shaft, which may be the engine-shaft, the line-shaft of the shop, or a counter-shaft. Said shaft has keyed to it a disk-wheel, with its opposite faces turned true, and having near the shaft a depression or concentric recess on each side. At right angles to the shaft and on each side of the disk-wheel the two arms of a twin or double hanger come from the ceiling or any other convenient place of support. The journal-boxes attached to these hangers may become the bearings of the main shaft, if so desired; or the holes through them may be so large that the shaft will pass through and not touch them. At the lower ends of these hangers there are cases in which journal-boxes are placed and each carries one end of a shaft. These shafts may be in a horizontal, vertical, or other position, as the machine to be driven or the work done may require. In each of these shafts and next to the boxes there is a key fitted, upon which and the shaft there is a wheel loosely fitted, so as to allow it to slide lengthwise of the shaft; but the motion imparted to the wheel by the disk-wheel will also be imparted to the shafts upon which they are placed. The outer ends of these shafts are provided with suitable journal boxes or bearings. Each of these shafts is provided with a spur gear or friction wheel. These wheels may be of the same size, in which case the shafts will revolve at the same speed; or one may be larger than the other, when the speed of the shafts will be in proportion to the size of the wheels. In each case the spur or friction wheels must have the same diametrical pitch as the wheels at the other ends of the shafts, less the space taken up by the disk-wheel.

By having the wheels on one shaft larger than the wheels on the other, I am enabled to get two differently-speeded shafts, from either or both of which I may drive machinery. These two shafts run in different directions, and one or both may be used to drive the machine, or a separate machine may be driven by each shaft. The hubs of the wheels designed to be driven by the disk-wheel are provided with grooves, into which a shifting apparatus is fitted. To this apparatus is attached a shifting lever or handle, by which the wheels are thrown nearer to or farther from the main shaft. When the friction-wheels are in the recesses of the disk-wheel, the motion of the machine ceases, and when the shifting handle or lever is so placed that the side wheels come in contact with the thick part of the disk-wheel motion is imparted to said wheels. As the friction-wheels are moved farther from the shaft so their number of revolutions are increased, and when moved toward it they are proportionally decreased.

In the drawings accompanying this specification, Figure 1 shows a plan view of the mechanism with the disk and friction wheels in section. Fig. 2 is a side elevation showing the disk-wheel mounted upon its shaft, together with one of the friction-wheels and a shifting mechanism. Fig. 3 is a sectional front elevation on line *x x* of Fig. 1, showing both friction and disk wheels, with the hangers by which their respective shafts are supported. Fig. 4 shows a vertical section through a part of the hangers and the journal-boxes in which the shafts revolve. Fig. 5 represents the lower end of one of the hangers, illustrating the construction of one of the journal-boxes which support the friction-wheel's shaft.

In the several figures, A represents the main shaft, which, as hereinbefore stated, may be a line or other shaft connected with a prime mover. Upon the shaft is firmly secured by keys or otherwise at any desired point the disk-wheel B. This wheel has two corresponding concentric recesses, *a a*, formed in its sides extending from its hub toward its periphery to a sufficient distance to allow space for the peripheries of the friction-wheels C C to revolve without touching the disk-wheel when the mechanism is disconnected. The outer portion, a' a', of the sides of the disk-wheel from the recesses to the circumference is turned perfectly straight, so that when the friction-wheels are brought in contact therewith they will have the same bearing at any point upon the surfaces.

D and D' are hangers and depend from the ceiling or other suitable point of support, each being provided with two downwardly-projecting arms, the hanger D being provided at the lower end of each arm with journal-boxes E, which embrace the main shaft and serve to steady said shaft at these points, although, if desired, the openings for the passage of said shaft may be left large enough to allow it to pass without touching. To the sides of these projecting arms of the hangers D, near their lower ends, are attached or cast integral therewith projecting guides b b, between which are placed the journal-boxes F F. These boxes have a laterally-sliding movement between the guides b b, restrained in one direction by the stop-plates c c, secured to the sides of the said guides by the adjusting-screws c' c', and prevented from too great a movement in the opposite direction by the plate-springs G, secured to the sides of the hanger with their lower ends bearing against the end of the box. These springs are also each provided with an adjusting-screw, c'', by which its pressure upon the box F may be regulated. These movable journal-boxes each carry one end of the shafts H H, upon which are mounted the sliding friction-wheels C C, the opposite end or part of said shafts beyond the friction-wheels being carried in journal-boxes I I, attached to the pendent arms of the hanger D'.

A spline or long keyway is cut in each of the shafts H and the hubs C' of the friction-wheels, provided with a feather-key sliding in said spline, thus allowing the frictions-wheels to move freely along the shafts, but compelling them to revolve therewith.

In order to afford a ready means of moving the wheels upon their shafts, I provide each of the hubs C' with an encircling-groove, d, in which rest the bifurcated ends of the shifter K. A hand-lever, L, is attached by pivotal connection to the ceiling or other suitable support, and extends downward to within easy reach of the operator. This hand-lever at d' is connected with the shifter K, affording convenient means for adjusting the position of the friction-wheels with relation to the recessed disk, as when said wheels are so placed that their peripheries are in the recesses of the disk-wheel it produces no effect upon them and they are motionless; but as they are drawn outward they impinge upon the straight surfaces a' of said wheels and are revolved thereby, their speed increasing as they approach the outer edge. It will therefore be apparent that the change from a state of rest to full speed is brought about by such gradual change as to avoid all shock to the mechanism itself or the machine driven thereby.

Upon each of the shafts H H is securely keyed a spur gear or friction wheel, M, which gears engage with each other, and when the friction-wheels C are of equal diameter these gears are the same; but when it is desired to give different speeds to the shafts H H, the diameters of the friction-wheels are also different and the size of the gear-wheels must also be changed to correspond with the difference of speed in the two shafts to which they are attached.

It will be seen that by the use of the two friction-wheels directly opposing each other upon opposite sides of the wheel-disk the pressure is evenly balanced, a great loss of power from the end pressure of the line or main shaft upon its bearings is prevented, while double the amount of frictional surface over that given by the ordinary single friction mechanism is obtained, thus really increasing the power of the machinery driven by the double friction without increasing the load on the motor. It will also be observed that the spring journal-boxes which carry the friction-wheel shafts afford ready means of changing the pressure of said wheels upon the disk-wheel, while adjustable stop-plates c, secured to the guides b at the inner ends of the journal-boxes F, prevent the springs from forcing the shafts H so far inward as to bring the peripheries of the friction-wheels in contact with the bottom of the recesses in the disk-wheel. It will also be seen that by this method of construction the shafts H H, which carry the friction-wheels, always preserve their parallelism, as it is not necessary to swing them out and in to effect an engagement of said wheels with the disk-wheel, such engagement being effected by the longitudinal movement of the friction-wheels upon their shafts. Thus the unequal wear and heating of journals caused by throwing said shafts out of alignment, as by the ordinary mode of throwing friction-gearing in and out of gear, is avoided.

Having thus described my invention, I claim as new, and desire to secure by Letters Patent, the following:

1. As an improvement in friction-gearing, the combination of a disk-wheel provided with concentric recesses upon its opposite sides and mounted upon a driving-shaft with two adjustable friction-wheels having their shafts carried by yielding bearings, said friction-wheels being adapted for engagement and disengagement by a longitudinal movement upon their shafts, substantially as specified.

2. As an improvement in friction-gearing, the disk-wheel mounted upon the driving-shaft, in combination with the friction-wheels mounted upon shafts revolving in yielding journal-bearings, said friction-wheels being adapted for engagement and disengagement by a longitudinal movement upon their shafts, as set forth.

3. As an improvement in friction-gearing, the combination, with the friction-wheel shafts, of the sliding journal-boxes, their supporting-hangers, the stop-plates, and springs adapted to bear upon one end of each of said journal-boxes, as and for the purpose set forth.

4. As an improvement in frictional gearing, the disk-wheel mounted upon the driving-shaft and provided with concentric recesses in its opposite sides, in combination with the two friction-wheels mounted upon shafts at right angles to said driving-shaft, and mechanism, substantially as shown and described, adapted to give a longitudinal movement to said friction-wheels upon their shafts for the purpose of engaging the same with or disengaging therefrom the disk-wheel, as set forth.

In testimony whereof I affix my signature in presence of two witnesses.

DANIEL WILDE.

Witnesses:
PHILIP MAURO,
GEO. FREVE FLINT.